May 26, 1964 E. C. BREKELBAUM ETAL 3,134,488

CRANE

Filed July 20, 1962 7 Sheets-Sheet 1

INVENTORS
ERWIN C. BREKELBAUM
JOHN I. JONES
GEORGE C. NOLL
JOHN D. NIELSEN &
BY GEORGE B. KLOS

Oberlin, Maky & Donnelly
ATTORNEYS

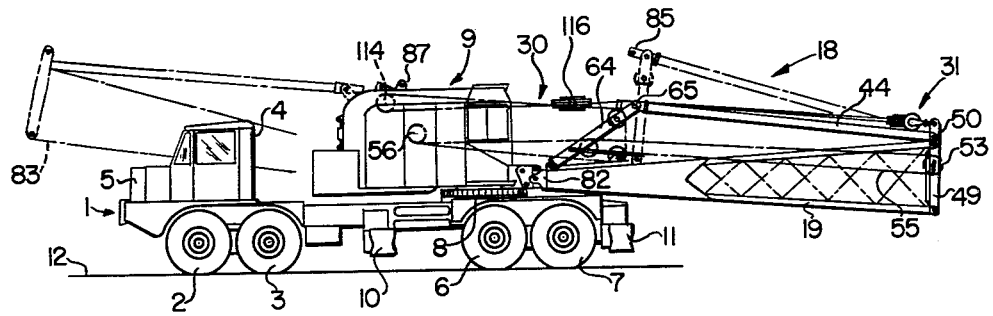
FIG 2
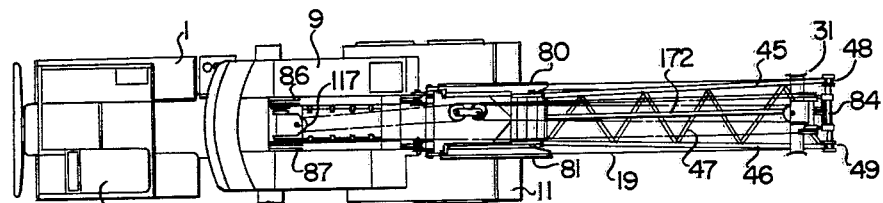
FIG 3
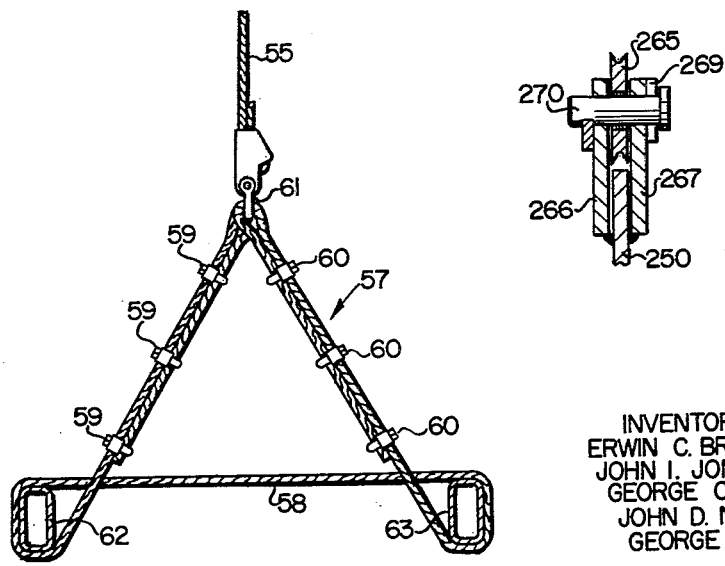
FIG 4
FIG 29
INVENTORS
ERWIN C. BREKELBAUM
JOHN I. JONES
GEORGE C. NOLL
JOHN D. NIELSEN &
GEORGE B. KLOS
BY Oberlin, Maky & Donnelly
ATTORNEYS May 26, 1964   E. C. BREKELBAUM ETAL   3,134,488
CRANE
Filed July 20, 1962   7 Sheets-Sheet 3
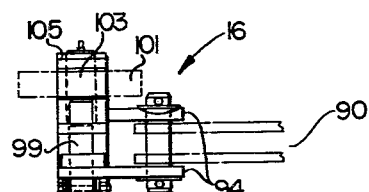
FIG 7
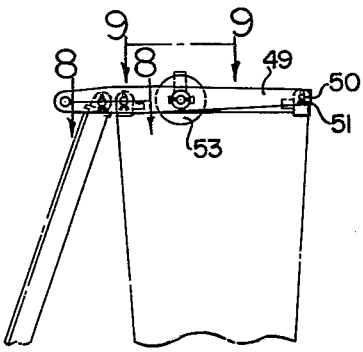
FIG 5
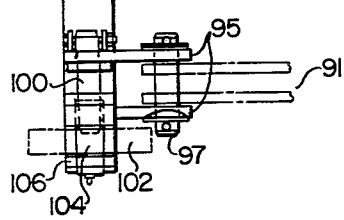
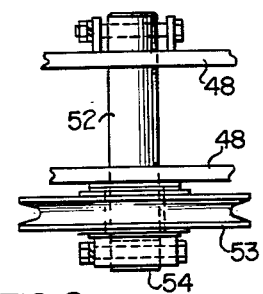
FIG 9
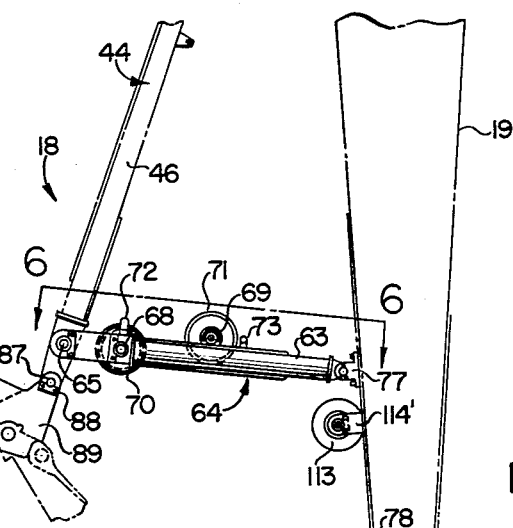
FIG 8
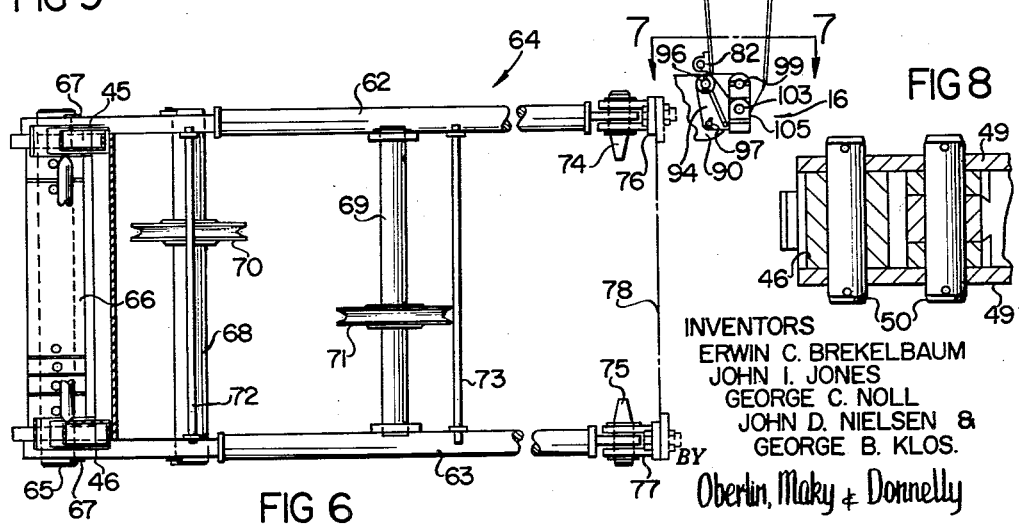
FIG 6
INVENTORS
ERWIN C. BREKELBAUM
JOHN I. JONES
GEORGE C. NOLL
JOHN D. NIELSEN &
GEORGE B. KLOS.
BY Oberlin, Maky & Donnelly
ATTORNEYS May 26, 1964  E. C. BREKELBAUM ETAL  3,134,488
CRANE Filed July 20, 1962  7 Sheets-Sheet 4

INVENTORS
ERWIN C. BREKELBAUM
JOHN I. JONES
GEORGE C. NOLL
JOHN D. NIELSEN &
GEORGE B. KLOS
BY
Oberlin, Maky & Donnelly
ATTORNEYS May 26, 1964   E. C. BREKELBAUM ETAL   3,134,488
CRANE
Filed July 20, 1962   7 Sheets-Sheet 5

INVENTORS
ERWIN C. BREKELBAUM
JOHN I. JONES
GEORGE C. NOLL
JOHN D. NIELSEN &
GEORGE B. KLOS
BY Oberlin, Maky & Donnelly
ATTORNEYS May 26, 1964   E. C. BREKELBAUM ETAL   3,134,488
CRANE Filed July 20, 1962                                              7 Sheets-Sheet 6

INVENTORS
ERWIN C. BREKELBAUM
JOHN I. JONES
GEORGE C. NOLL
JOHN D. NIELSEN &
GEORGE B. KLOS

BY Oberlin, Maky & Donnelly

ATTORNEYS

May 26, 1964 E. C. BREKELBAUM ETAL 3,134,488
CRANE
Filed July 20, 1962 7 Sheets-Sheet 7
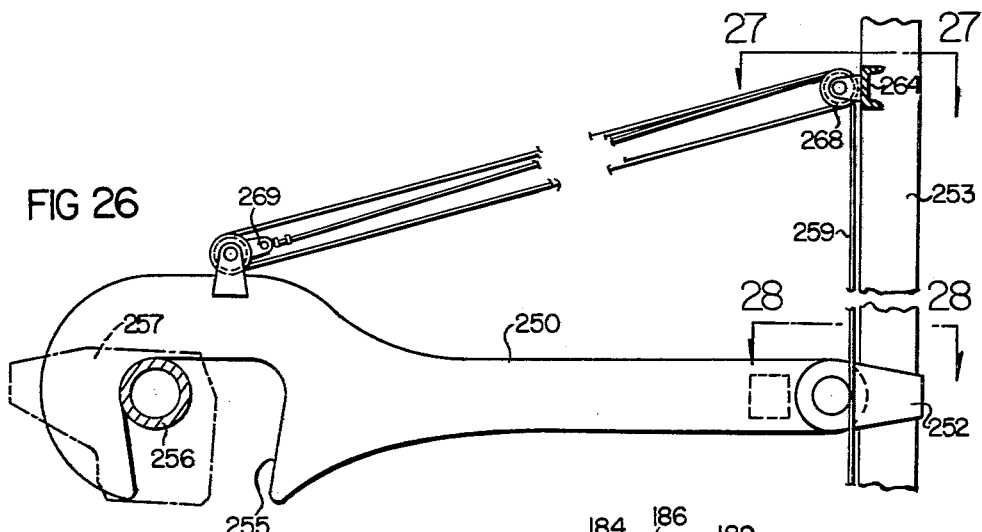
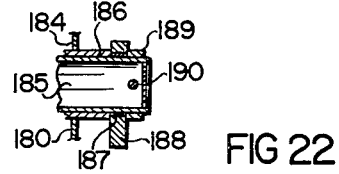
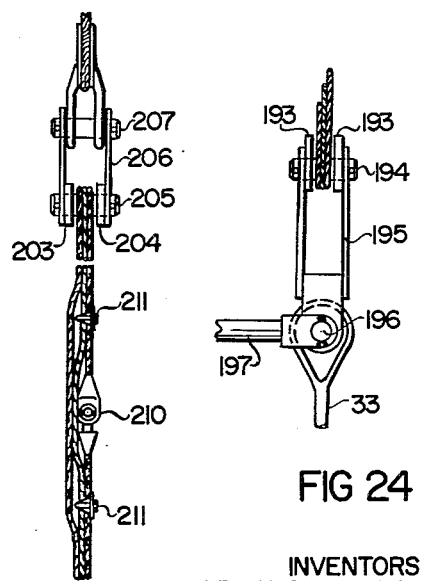
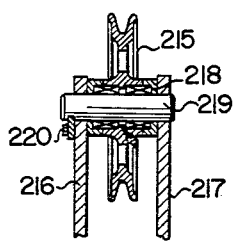
INVENTORS
ERWIN C. BREKELBAUM
JOHN I. JONES
GEORGE C. NOLL
JOHN D. NIELSEN &
GEORGE B. KLOS
BY
Oberlin, Maky & Donnelly
ATTORNEYS

United States Patent Office 3,134,488
Patented May 26, 1964

3,134,488
CRANE
Erwin C. Brekelbaum, Elyria, John I. Jones, Lorain, George C. Noll, North Ridgeville, John D. Nielsen, Lorain, and George B. Klos, Elyria, Ohio, assignors to The Thew Shovel Company, Lorain, Ohio, a corporation of Ohio
Filed July 20, 1962, Ser. No. 211,282
17 Claims. (Cl. 212—46)

This invention relates generally, as indicated, to a crane and more particularly to certain improvements in a tower crane of the type shown in the copending application, Serial No. 86,166 entitled "Crane," filed January 31, 1961, now Patent No. 3,083,837, and assigned to The Thew Shovel Company of Lorain, Ohio.

With cranes of the type shown in such copending patent, it is possible to obtain the advantages of mobility found in conventional rubber-tired cranes and also all of the advantages of European-type tower cranes. With the improvements of the present invention, for a given weight and mass of machinery, a crane is provided which will lift more at greater ranges and develop capacities in ranges approaching those of conventional machines of almost double the basic crane rating.

The machine of the present invention represents not a single-purpose machine, but a machine wherein the tower attachment can readily be installed or removed so that the machine can operate as a tower crane or a conventional crane, clamshell or dragline machine. Moreover, for the machine to act as a tower crane, no major changes are required in the standard crane turntable or carrier and a conventional crane boom may be utilized as the jib or top boom for the tower crane. One of the basic problems in tower cranes is the erection of such cranes and generally outside assistance such as an additional crane is required to assemble the tower. Moreover, with the present invention, the tower and boom can be erected without outside assistance in far less space than is required to assemble conventional long booms. With the tower crane of the present invention, it is possible to reach up and over buildings being erected or torn down for close quarter operations.

It is accordingly a principal object of the present invention to provide a tower crane attachment for conventional cranes which can easily be erected or disassembled in a minimum amount of space.

A further principal object is the provision in such a tower crane of a highly efficient reeving system whereby the tower and standard operating boom attached to the peak thereof can be elevated to operating position and such standard boom controlled through its operating ranges by such reeving system.

Another important object is the provision in such tower crane of a means automatically to latch the standard boom in folded condition to the tower boom so that the two may be elevated as a unit to operating position.

A further important object is the provision of an improved tower crane having increased reach and lifting capabilities.

Another object of the present invention is the provision of a unique boom stop attachment interconnecting the tower boom and the standard operating boom pivoted to the peak of the tower boom to preclude the standard boom from pivoting over the back of the tower.

Yet another object is the provision of such boom stop which will automatically be folded or collapsed to an out-of-the-way position as the standard boom is folded to lie parallel to the tower boom.

A still further object is to provide an improved tower crane of the type shown in the aforementioned copending patent.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 2 is a side elevation of such crane on a somewhat enlarged scale illustrating the procedure for raising and lowering the tower boom stabilizer mast;

FIG. 3 is a top plan view of the crane shown in FIG. 2;

FIG. 4 is an enlarged detail view of a sling which may be employed with the hoist cable for raising and lowering of such stabilizer;

FIG. 5 is a fragmentary side elevation illustrating the base section of the tower boom in raised position with the stabilizer mast in place;

FIG. 6 is an enlarged detail view taken substantially on the line 6—6 of FIG. 5;

FIG. 7 is a detail view of the boom foot adapter taken substantially from the line 7—7 of FIG. 5;

FIG. 8 is a fragmentary transverse section on an enlarged scale taken substantially on the line 8—8 of FIG. 5;

FIG. 9 is an enlarged detail view taken from the line 9—9 of FIG. 5;

FIG. 22 is an enlarged fragmentary section of the proximal pivot of the lower mast at the peak of the tower boom taken on the line 22—22 of FIG. 17;

FIG. 23 is a detail view of the pendant connection to the distal end of the upper mast taken on the line 23—23 of FIG. 17;

FIG. 24 is a detail view of the pendant connection to the distal end of the lower mast taken on the line 24—24 of FIG. 17;

FIG. 25 is a vertical detail sectional view of the hoist line sheave mounted at the peak of the tower boom;

FIG. 26 is an enlarged detail side elevation of the remotely operable hook employed to fasten the standard boom to the tower boom when the two are in folded condition;

FIG. 27 is a fragmentary horizontal section taken substantially on the line 27—27 of FIG. 26;

FIG. 28 is a top plan view of the pivotal connection of the proximal end of the hook to the tower boom; and FIG. 29 is an enlarged fragmentary sectional detail view taken on the line 29—29 of FIG. 26.

Figure 1:
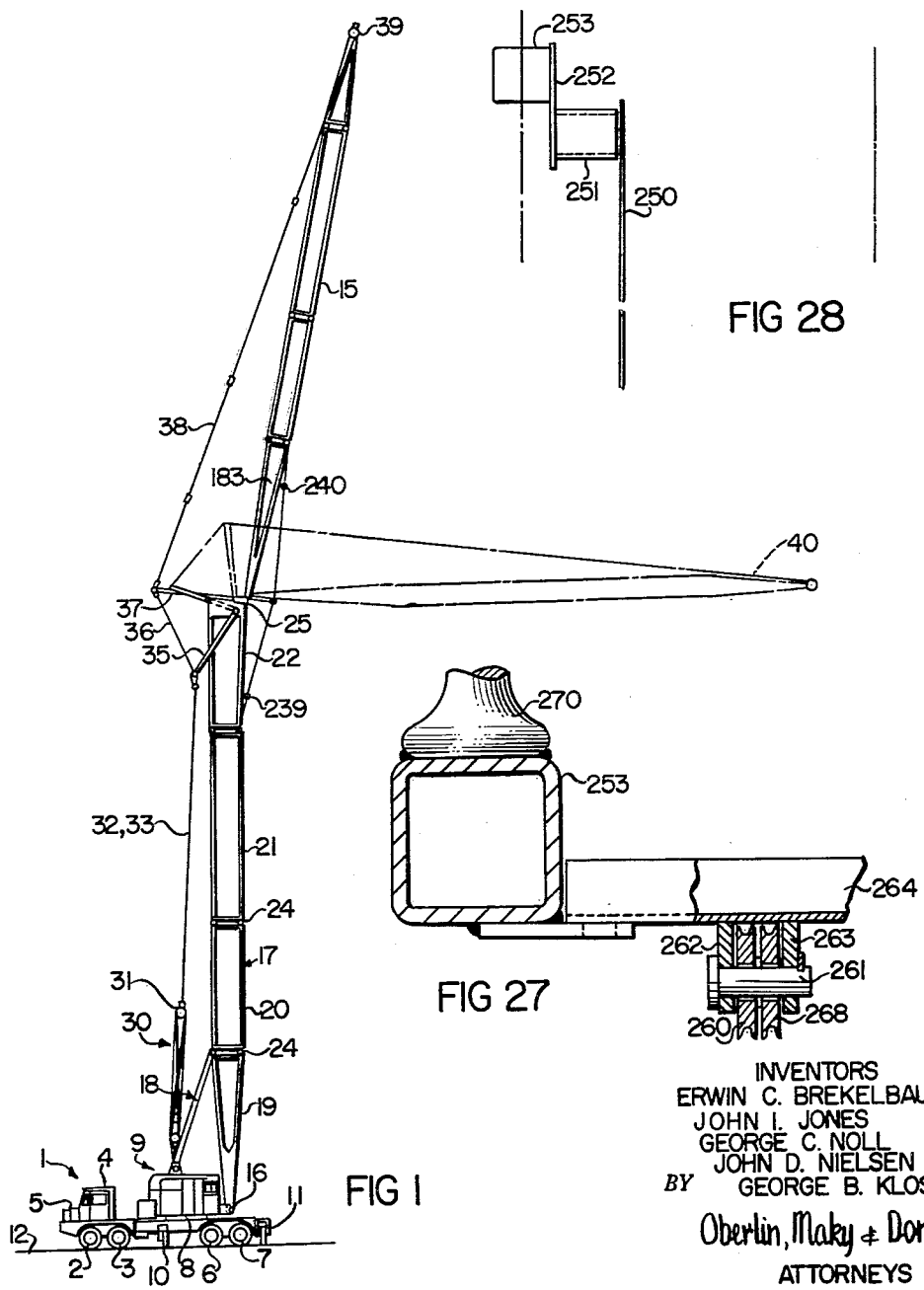
FIG. 1 is a side elevation of a tower crane in accordance with the present invention with the standard operating boom shown pivoted to the peak of the tower boom in an alternative phantom line position extending substantially horizontal.

Referring now to the annexed drawings and more particularly to FIG. 1, there is shown a side elevation of a tower crane in accordance with the present invention. The crane is mounted on a rubber-tired carrier shown generally at 1 which in the illustrated embodiment may be an 8 x 8 carrier. The front two sets of wheels 2 and 3 are steerable from the driver's compartment 4 and a prime mover located generally at 5 may be employed to drive all sets of wheels 2, 3, 6 and 7. A turntable 8 mounted on the bed of the carrier supports the crane superstructure 9 for rotation about its vertically extending axis. To provide a firm and stable base for the operation of the machine, there is provided pairs of hydraulically operated quickly positioned outriggers 10 and 11 secured to the carrier frame. In less than a minute, the outriggers may be extended outwardly and downwardly to contact the ground 12 automatically leveling and firmly supporting the machine on an extra wide base. The carrier 1 thus affords a firm and stable base for the operation of the machine which is highly mobile due to the rubber tire mounting and the quickly retractible hydraulically operated outriggers 10 and 11 and yet which when said outriggers are extended provides a firm rigid base.

The superstructure 9 of the crane which revolves about the vertically extending axis of the turntable 8 may be a conventional heavy duty crane superstructure which would normally be employed with the standard crane boom 15 pivoted to a boom foot 16 for operation in the conventional manner. However, with the present invention, a special adapter is provided at the boom foot, hereinafter described, and a tower boom 17 is mounted on such boom foot in a vertical position and locked in such position by a stabilizer mast assembly shown generally at 18. In the illustrated embodiment, the tower boom comprises a base section 19, intermediate sections 20 and 21, and a peak section 22 providing an elevated foot 23 for the standard operating boom 15. The tower boom sections are pin-connected together as indicated at 24 and a tower boom of varying height can thus be obtained by adding or subtracting boom sections. The standard operating boom 15 is similarly composed of boom sections which are pin-connected together and such boom can be lengthened or shortened by addition or removal of such boom sections.

Figure 10:
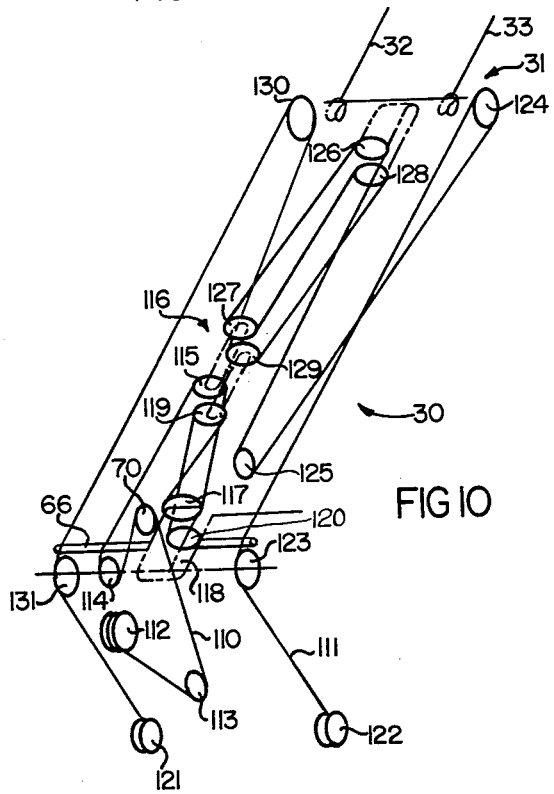
FIG. 10 is a diagrammatic illustration of the reeving system employed for the erection of the tower and operating boom and for the operation of such operating boom.
Figure 11:
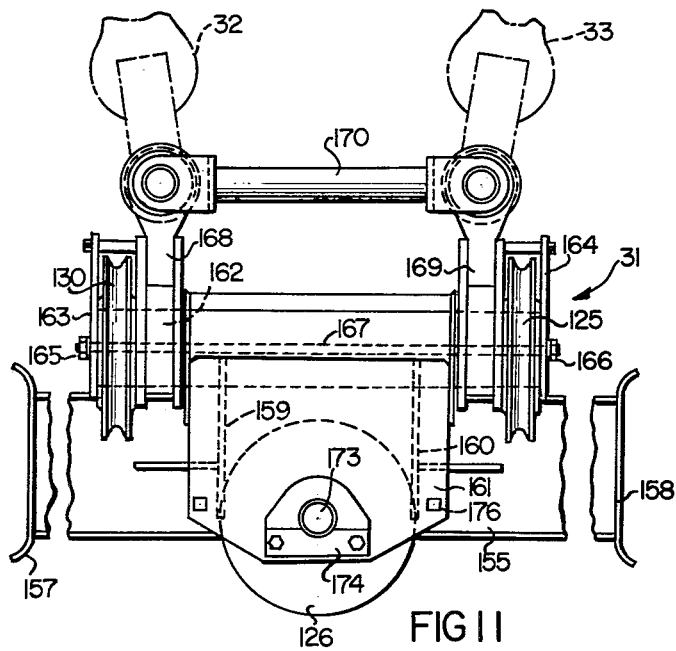
FIG. 11 is an enlarged top plan view of a floating harness employed with the reeving system of the present invention.
Figure 12:
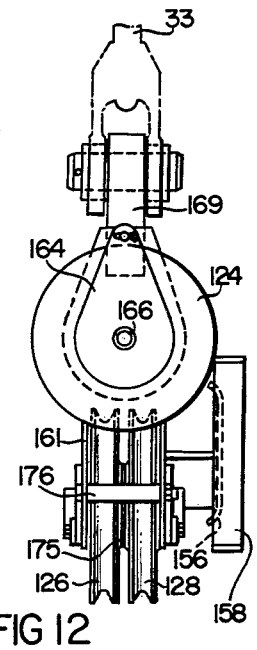
FIG. 12 is a side elevation of such harness as seen from the right in FIG. 11.

A reeving system shown generally at 30 is connected to boom hoisting drums in the superstructure 9 and to a floating harness 31 shown in detail in FIGS. 10, 11 and 12, to which is connected boom pendants 32 and 33. These pendants are connected in the manner shown in FIGS. 17 and 24 to a pair of lower masts 35 pivoted to the peak of the tower boom 17. Further pendants 36 connect each of the masts 35 with a further pair of masts 37 also pivoted to the peak of the tower boom. The peaks of each of the masts 37 are then connected by pendants 38 to the peak 39 of the standard operating boom 15. The pendants 38, like the boom 15, are comprised of sections which can be removed or added to decrease or increase, respectively, the length of the pendants to correspond to the length of the boom. The hoisting machinery in the superstructure 9 then operates the reeving 30 to exert a pull on the pendants 32, 33, 36 and 38 to elevate the standard operating boom to the maximum height position shown in full lines in FIG. 1. The normal operating range will vary from the phantom line position 40 to the full line position shown.

By disconnecting the stabilizer 18, which is pin-locked to the tower boom and to the peak of the A-frame of the superstructure 9, the entire tower boom and the standard operating boom, when the latter is pivoted to lie adjacent and parallel to the tower boom, can be lowered to the ground as shown in the aforementioned copending application. In this manner, the machine is entirely self-erecting and outside assistance is not required to erect the tower boom with the standard operating boom pivoted to the peak thereof. When the tower and operating boom are folded and lowered to the ground, the various boom sections may then be disassembled and transported to another working site. If the distance to be traveled is not great, the crane can be moved simply by folding the standard operating boom to a vertically extending position adjacent the tower and with the outriggers retracted, the crane can be moved short distances at the working site.

Since the stabilizer mast assembly, in the lowered position of the crane, would present a height too great for most normal road clearances, there is illustrated in FIGS. 2, 3 and 4 a procedure for raising and lowering the stabilizer mast assembly without employing outside assistance. As seen also in FIGS. 5, 6, 8 and 9, the stabilizer assembly 18 may comprise a stabilizer mast 44 shown in FIG. 3 as comprising two chord members 45 and 46 interconnected by a continuous tubular lacing member 47 bent to zig-zag fashion and welded to the flat inner faces of the chords 45 and 46. The upper or outer end of the stabilizer mast 44 is pin-connected to pairs of brace members 48 and 49 connected to the opposite sides of the outer end of the base tower boom section 19. As seen in FIG. 8, pins 50 may be employed in connection with such braces both to hold the chords 45 and 46 of the stabilizer mast and to interconnect the base tower boom section 19 with the next adjacent boom section 20. Cotter pins or the like 51 may be employed to hold such pins in place. Either pair of brace members 48 or 49 may be employed to mount a sheave shaft 52 as seen in FIG. 9 having a sheave 53 journalled on the inwardly projecting end 54 of such shaft.

As seen in FIG. 2, the hoist line 55 wrapped about the hoist drum 56 may be employed with the special sling 57 shown in FIG 4 to raise and lower the stabilizer assembly 18. The sling 57 comprises a cable 58 having its ends looped and clamped by the series of three clamps each shown at 59 and 60 with the looped ends being fastened to the hoist cable by the shackle and wedge socket shown at 61. The sling may then be wrapped around the struts 62 and 63 of the frame 64 with such struts being pivoted to the stabilizer mast 44 by the shaft 65. Cable rollers 66 of varying lengths may be stacked upon the shaft 65 between the struts 45 and 46 and keepers 67 may be employed at each end of the shaft to maintain the stabilizer frame 44 in an articulated relationship to the frame 64 with both frames thus constituting the stabilizer assembly 18.

Shafts 68 and 69 are also mounted between the struts 62 and 63 and each being provided with a cable sheave as shown at 70 and 71, respectively. Guards 72 and 73 also extend between such struts closely adjacent such sheaves precluding the cables trained thereabout from jumping. The inner ends of the struts 62 and 63 are connected by mast strut pins 74 and 75 respectively through clevised brackets 76 and 77 mounted on the reinforcing plate 78 at the inside of the face of the tower boom base section 19. Again, cotter pins may be employed releasably to secure such strut pins in place.

Referring particularly to FIGS. 2 and 3, to lower the stabilizer mast assembly 18, the tower base section 19 is lowered until there is no strain placed upon the derricking cables of the reeving system 30. The sling 57 is then attached to the stabilizer struts 62 and 63 as seen in FIG. 4 and the hoist line 55 is run over the auxiliary sheave 53 and back to the sling and attached using the shackle and wedge socket shown. The operator then reels in the slack in the hoist line with the hoist drum 56 and with such slack removed, the stabilizer strut pins 74 and 75 are then removed. When the strut pins are released, the struts 62 and 63 will drop onto the plate 78 and guide flanges 80 and 81 may be employed to guide such struts backwardly along the boom base section with the operator using the hoist line to control the speed of such backward sliding movement. The struts will slide backwardly with the stabilizer assembly moving from the dotted line position in FIG. 2 to the full line position until the holes in the ends of the struts are lined up with strut anchor brackets 82 and the strut pins may then be reinserted to lock the stabilizer assembly in the full line position shown in FIG. 2. The boom base section may then be moved to the travel position shown in phantom lines at 83 or the tower boom base section using the auxiliary sheave 53 may be employed for various short height hoisting operations such as the removal of a counterweight. The derricking cables of the reeving system 30 will contact the cable rollers 66 on the shaft 65 and the floating harness 31 which is now released from the pendants 32 and 33 may be connected to shaft 84 extending between the projecting ends of the pairs of braces 48 and 49.

To raise the stabilizer mast assembly, the tower boom section is swung around and lowered to the full line position shown in FIG. 2 and again the sling 57 may be attached to the struts 62 and 63 as indicated. After the operator has removed the pins from the strut anchor brackets 82, the hoist line may then be employed to pull up the struts until the holes in the ends thereof are aligned with the holes in the brackets 76 and 77 and the strut pins can then be inserted and locked in place with the stabilizer mast assembly then erected.

It is noted that the mast chords 45 and 46 extend beyond the stabilizer shaft 65, the extension of each chord being provided with aligned openings 85 which are pinned to the peak of the A-frame at 86 and 87 as seen in FIG. 3. Noting FIG. 5, a keeper 88 may be employed to hold the pins in place so that when the tower is raised to its vertical position, the stabilizer assembly 18 can readily be pin-connected to the peak of the A-frame 89 to provide a rigid locking link between the superstructure A-frame and the vertically extending tower boom 17.

Referring now to FIGS. 5 and 7, the superstructure of the crane is ordinarily provided with projecting pairs of vertically extending plates 90 and 91 having aligned apertures in the ends thereof to which the standard crane boom is ordinarily pivoted. With the present invention, a special adapter 92 is provided accommodating both the somewhat wider tower boom 17 and the standard operating boom 15. The bottom boom plates provided with aligned apertures are normally fitted between the member pairs 90 and 91 and pin-connected thereto. The special adapter 92 which is of unitary construction is provided with pairs of vertically extending frame plates 93 and 94 which fit over the outsides of the superstructure members 90 and 91 and are pin-connected thereto each by two pins 96 and 97. In this manner, the adapter constitutes a forward extension of the boom foot of the superstructure and the standard operating boom may then be pin-connected between the frame members 94 and 95 by the pins 99 and 100 or the somewhat wider base plates 101 and 102 of the tower boom may be pin-connected by pins 103 and 104 outside of the pair of members, yet inside of the outer upstanding projections 105 and 106. The pins 99 and 100, will of course, have to be removed to permit the insertion of pins 103 and 104 for the tower boom. Accordingly, with the boom foot adapter, both the standard and tower booms may be accommodated on the crane without removing or adjusting the adapter and both are provided with a foot extending slightly farther from the centerline of the turntable than would otherwise be provided.

To erect the tower and standard boom and to operate the standard boom through the illustrated operating ranges, there is provided the reeving system shown schematically in FIG. 10. Such reeving system 30 is comprised of two derricking cables 110 and 111 with the somewhat shorter derricking cable 110 being trained about a relatively inexpensive hoisting drum 112, about boom base rooster sheave 113 (not the sheave 113 mounted on bracket 114' in FIG. 5) and thence about the stabilizer frame derricking sheave 70, and then about sheave 114 mounted on the A-frame shaft and harness (see FIG. 2), and then over the rollers 66 on the stabilizer axle 65 to pass about the top lowermost sheave 115 of floating link 116. From such floating link sheave, the cable 110 passes about the uppermost sheave 117 of padlock harness 118 mounted on the A-frame peak shaft. The cable 110 then passes about the bottom lowermost sheave 119 of the floating link 116, about the bottom sheave 120 of the padlock harness and is then dead ended on such bottom sheave of the A-frame harness. Accordingly it can be seen that the drum 112 is effective to exert a pull on the sheaves 115 and 119 of the floating link.

The somewhat longer derricking cable 111 is trained about and secured to drums 121 and 122 which may be on the same shaft and have a common drive. The drums 121 and 122 may be provided with ratchets as well as power-up and power-down controls and such features as automatic brakes. A cable from the drum 122 passes over the top of sheave 123 at the peak of the A-frame, over the rollers 66, and about the sheave 124 mounted on one end of the floating harness 31. (Note FIGS. 11 and 12.) From such sheave 124, the cable may pass about a special sheave 125 which may be connected to the machine frame by a special safe-load indicating mechanism such as that shown in U.S. Patent No. 2,988,040 issued to R. L. Aitken. Such mechanism may be employed to measure the pull on the derricking cable 111, and through a special radius compensating linkage shown in copending application, Serial No. 212,090 entitled Indicator for Cranes and the Like filed July 24, 1962, such mechanism may be adjusted to compensate the load for the particular radius to give the operator of the crane a special warning as the crane rated capacity is approached. From the safe-load indicator sheave 125, the cable 111 passes about the uppermost sheave 126 on the harness 31 and then about the top uppermost sheave 127 on the floating link 116. The cable then extends back about the lowermost sheave 128 on such harness 31 and then back again about the bottom uppermost sheave 129 in the link 116. From such sheave, the cable then passes about the opposite sheave 130 on the harness 31 and then down over the roller 66 about the sheave 131 on the A-frame harness and then onto the drum 121.

Figure 14:
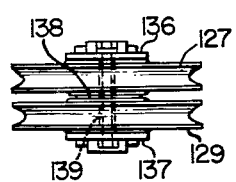
FIG. 14 is an end elevation of such floating link.
Figure 13:
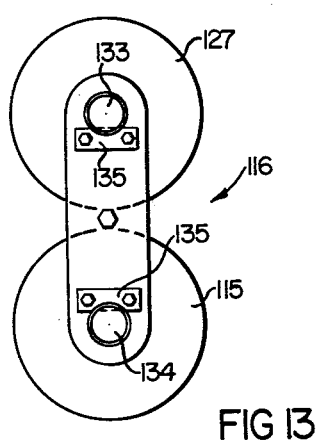
FIG. 13 is a top plan view on an enlarged scale of a floating link employed with the reeving system.

It can now be seen that the two derricking cables 110 and 111 are interconnected by means of the floating link 116 shown in more detail in FIGS. 13 and 14. The upper pair of sheaves 127 and 129 are mounted on a shaft 133 and similarly the lower sheaves 115 and 119 are mounted on a similar shaft 134, both of which are held by keeper plates 135 to links 136 and 137. Thrust washers may be interposed between the sheaves as shown at 138 and a spacer 139 may be provided interconnecting the links between the pair of sheaves firmly to hold the links apart and to serve as a cable guard for the particular sheaves. If the cable 110 is wound upon the drum 112, it will tend to pull the floating link downwardly causing the cable 111 to be unwound from the drums 121 and 122. To raise the tower and standard boom in its folded condition to the vertical position, the cable 111 is wound upon the drums 121 and 122 and during such raising of the booms, the upper floating harness 31 will, of course, remain fixed with respect to the distal ends of the lower mast 35 due to the fixed lengths of the pendants 32 and 33. During such raising of the booms, the floating link 116 will be pulled upwardly taking up the slack in the derricking cable 110. When the tower boom is in its vertical position and locked by means of the stabilizer assembly, the drum 112 may then be employed to wind the cable 110 thereon pulling the link 116 downwardly to unwind the cable 111 from the drums 121 and 122. In this manner, the amount of the derricking cable 111 used to elevate the tower can then be spooled off the drums 121 and 122 and used over again to raise the standard boom to and through its operating range. The second less expensive drum 112 is then merely employed to effect a dual operation of the drums 121 and 122 thus reducing the drum capacity and length of cable that would otherwise be required.

Figure 15:
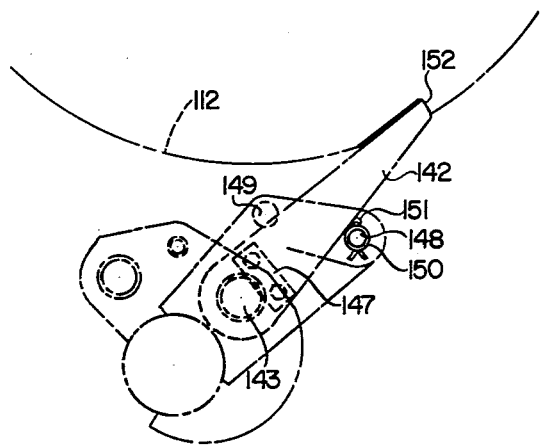
FIG. 15 is an enlarged side elevation of a safety pawl employed with the present invention.
Figure 16:
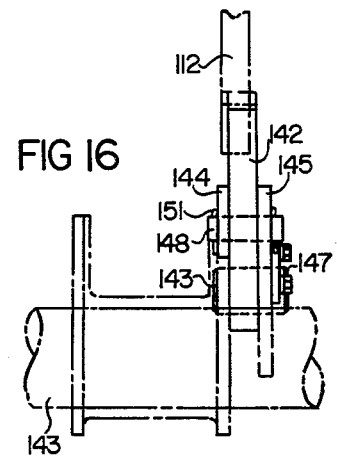
FIG. 16 is an end elevation of such safety pawl.

Since the drum 112 and the derricking cable 110 need not be employed after the tower is erected and the standard boom is in its operating ranges, a special safety pawl 142 is provided locking such drum precluding unwinding of the derricking cable 110 and thus movement of the floating link 116. The safety pawl 142 is pivoted on a pin 143 extending between plates 144 and 145 mounted on shaft 146 which is parallel to the axis of the drum 112. The pin 143 may be held in place by keeper 147 and a stop pin 148 may be disposed in either of two pairs of aligned openings 149 and 150 in such plates 144 and 145. When the stop pin is disposed as seen in FIG. 15 in the openings 150 and held in place by cotter pin 151, the safety pawl 142 will be maintained in notch 152 of the drum 112 and such pin precludes the pawl from being removed from the notch. Conversely, if the pin 148 is disposed in the aligned openings 149, the safety pawl will be precluded from moving into the notch to stop the rotation of the drum. The safety pawl is thus locked out of engagement with the drum when the pin is disposed in the holes 149 and is locked into engagement with the drum when the pin is disposed in the holes 150.

Referring now to FIGS. 11 and 12, it will be seen that the floating harness 31 is provided with a plate support 155 having upturned front and rear edges as seen at 156. Side guide plates having outturned edges 157 and 158 are also provided. In this manner, the harness may be supported on top of the tower boom when in a horizontal position and slid therealong during erection of the crane. Such plate 155 is supported by frame plates 159 and 160 secured to the clevis 161 holding sheaves 126 and 128 with respect to the axle 162 which has mounted on the ends thereof sheaves 130 and 124. End plates 163 and 164 may be held on such axle by nuts 165 and 166 threaded on elongated stud 167 passing through such axle and sheaves. The clevis 161 is centered between links 168 and 169. A cable spreader 170 interconnects such links and the pendants 32 and 33 may be fastened to the outer ends of the links as indicated. As seen in FIG. 3, the stabilizer mast 44 may be provided with longitudinal runners 172 further to support the floating harness 31.

The clevis 161 for the floating harness comprises essentially a U-shape holder for the sheaves 126 and 128 supporting such sheaves with respect to the axle 162. A sheave shaft 173 passes through the clevis and such sheaves 126 and 128 are journalled on such shaft. A keeper 174 may be employed at each end of the shaft holding the same in place and a spacer 175 may be disposed between such sheaves. Tubular cable guards 176 at each side of the clevis may be employed also firmly supporting the top and bottom plates of such clevis.

Figure 17:
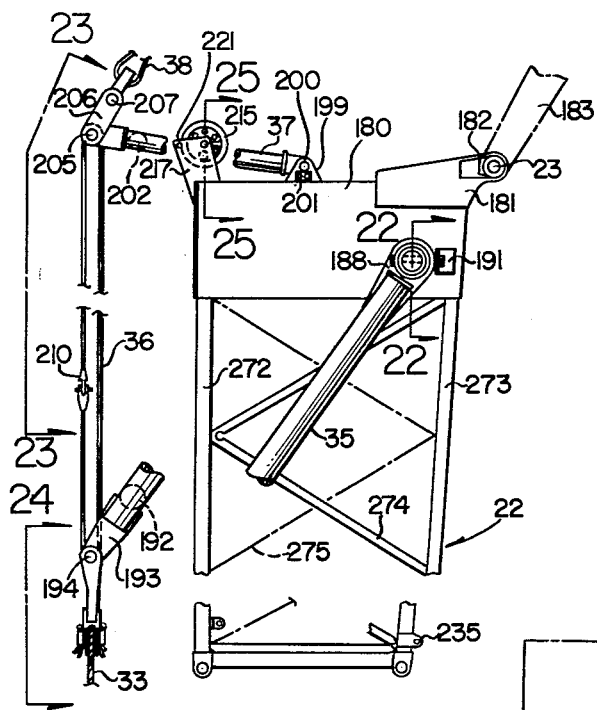
FIG. 17 is a detail view of the peak section of the tower boom, the upper and lower masts pivoted thereto and the attachment of the boom pendants to such masts.

Referring now to FIG. 17 and detail views 22 through 25, it will be seen that the peak or top section 22 of the tower 17 is provided with a cap 180 formed of front and back and side plates welded to the top of the peak section. At the top front outside edge of the cap 180, there is provided pairs of projecting plates 181 at each side providing the foot 23 for the standard boom 15. Such boom foot may be provided by heavy-duty pins held in place by removable keepers 182. It is here noted that the peak section 22 of the tower is considerably wider at the top than at the bottom where it is pin-connected to the section 21. In addition, the foot 23 projects beyond the front edge of the cap 180 and in this manner the standard boom 15 is permitted to be folded to lie parallel to and adjacent the tower 17. The enlarging taper of the peak section 22 will then more readily nest with the base section 183 of the standard boom 15 in such folded condition. As seen in FIG. 22, each side of the cap 180 is provided with an aperture 184 through which extends a closed end tube 185 surrounded at each end by a sleeve 186 welded to the respective side plate of the cap 180. At the end of such sleeve, a bushing 187 surrounds the tube 185 and the apertured end plate 188 of the lower mast 35 is mounted on such bushing for pivotal movement about the axis of the transverse tube 185. A collar 189 is held in place by a nut and bolt assembly 190 also passing through a bracket 191 on the side plate of the cap 180. A tubular transverse strut 192 may be secured between each of the lower masts 35 as seen in FIG. 17 and the outer end of each mast may be provided with two projecting plates 193 having aligned apertures accommodating pin 194. Also secured to the pin 194 is a link 195, the lower end of which is provided with aligned apertures for pin 196 around which the upper end of the pendant 33 is secured. A spreader bar 197 extends between the link pin 196 and the opposite link for the pendant 32. The lower end of the lower mast on the opposite side of the cap 180 will similarly be connected to such pendant 32.

The upper masts 37 are pivoted to the top of the cap 180 on brackets 199 with suitable pivot pins 200 being employed held in place by removable keepers 201. Transverse frame member 202 may be employed between the upper masts in the same manner as the transverse frame member 192 is provided between the lower masts ensuring that both of each pair of upper and lower masts pivot as a unit about the respective proximal ends. The outer end of each upper mast 37 is provided with two projecting plates 203 and 204 having aligned apertures through which the pin 205 is fastened. Pendant links 206 are fastened to such pin and to pin 207 to which is secured the lower end of one of the pendants 38 of the standard boom 15. The pendants 38 may, for example, be 1¼ inches in diameter and the pendants 32 and 33 may be 1½ inches in diameter. However, the pendants 36 interconnecting the peaks of the upper and lower masts are preferably a cable of approximately ⅝ inch diameter. These cables as seen in FIGS. 23 and 24 may be trained about the pins 194 and 205 three times with the ends locked together by the pin and clevis mechanism shown at 210. Cable clamps 211 secure the joined ends to the adjacent strand and as many as three such clamps on each side of the connection 210 may be employed spaced on 12 inch centers. In this manner, with a lighter, longer cable, the pendant connection between the distal ends of the upper and lower mast structures is provided.

The top of the cap 180 is also provided with a hoist sheave 215 mounted between upstanding plates 216 and 217 at the back edge of such cap. Such sheave is mounted on roller or like bearings 218 on axle 219 held in place by keeper 220. The hoist cable from which the load is supported in the operating position extends from the hoist drum 56 about the sheave 71 supported on axle 69 between the struts 62 and 63 of the stabilizer frame 64 and then straight upwardly about the sheave 215 and then to the peak of the standard boom and about the hoist sheave mounted at such peak. As seen in FIG. 17, a cable guard 221 may be employed between the plates 216 and 217 to maintain the hoist cable in engagement with the tower peak sheave 215. In this manner the hoist cable which is connected directly to the load is trained about only three sheaves in passing from the drum 56 to such load.

Figure 20:
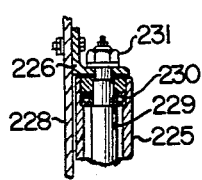
FIG. 20 is a fragmentary transverse section on a somewhat enlarged scale taken on the line 20—20 of FIG. 19.
Figure 19:
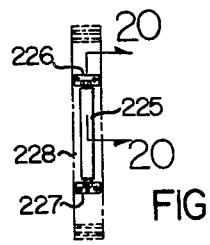
FIG. 19 is a detail view taken substantially on the line 19—19 of FIG. 18.
Figure 18:
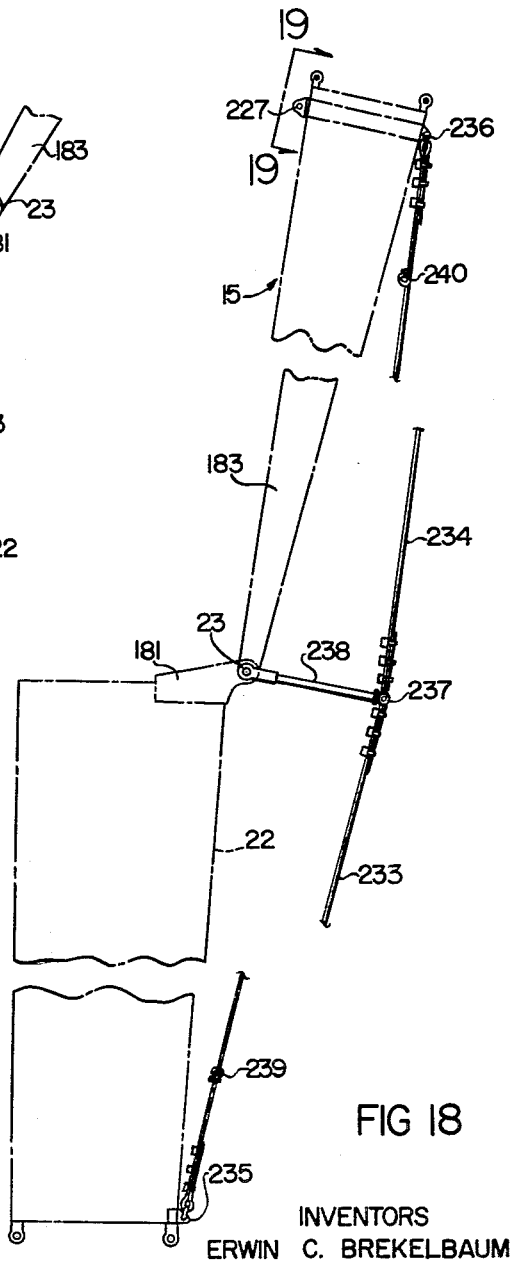
FIG. 18 is a fragmentary side elevation of the Kelly boom stops employed between the tower and standard boom to preclude the standard boom from pivoting back over the top of the tower boom.

When paying out or reeling in the hoist line without a load, it will generally sag between the sheave 215 and the sheave at the peak of the standard boom 15 and to preclude excess cable wear, rollers such as shown in FIGS. 18, 19 and 20 may be provided on such standard boom. This cable-boom contact may be especially noticeable when the standard operating boom is in the horizontal operating position shown in phantom lines at 40 in FIG. 1. To preclude this excess cable wear, the roller 225 may be provided mounted on brackets 226 and 227 secured to strap or plate 228 extending between the chords of the base section 183 at its outer end. Each end of the axle 229 of the roller may be provided with roller bearings as shown in FIG. 20 at 230, the reduced diameter end portion of the axle projecting through the brackets 226 and 227 and secured thereto by the nuts 231.

Figure 21:
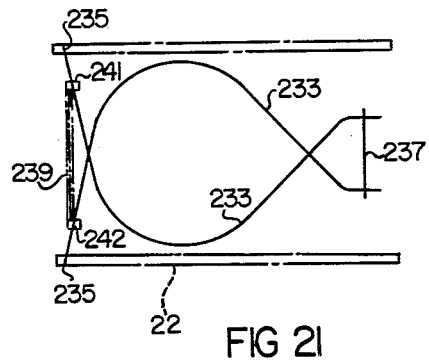
FIG. 21 is a fragmentary diagrammatic illustration of the manner in which the Kelly boom stops collapse as the standard boom is folded to lie parallel to the tower boom.

It is generally preferred to provide in cranes a mechanical stop to preclude the operating boom from pivoting over the back of the machine should the operator accidentally excessively elevate the boom or should the hoist cable part with the resultant reaction being the backward pivoting of the boom. To provide a mechanical stop between the tower and the operating boom, there is provided two pairs of cables 233 and 234 with the lower pair being connected at 235 to the opposite sides of the peak section 22 of the tower 17 and the upper pair being connected at 236 to the opposite sides of the upper end of the base section 183 of the standard boom 15. The opposite ends of the cables are connected at 237 to a pair of arms 238 which are pivoted to the standard boom foot 23. In the FIG. 18 position, the cables 233 and 234 are stretched as taut as possible and this position of the standard boom is the maximum elevation thus obtainable. Since the booms 15 and 17 are adapted to be folded to lie parallel to each other, spring mechanisms 239 and 240 are provided interconnecting each of the cables of each pair. Each spring is connected to cable clamps 241 and 242 as shown in FIG. 21 and extends transversely of the respective peak and base boom sections. When the cables are drawn taut as seen in FIG. 18, the springs 239 and 240 will elongate and be under considerable tension. However, when the booms are folded or the angle between them considerably diminished, the springs will tend to pull the cables of each pair into the overlapping looped fashion shown in FIG. 21 thus precluding the cables from dangling or becoming fouled in the machinery. Accordingly, there is provided a mechanical boom stop between the tower and standard boom which will automatically fold the boom stop cables to an out-of-the-way position adjacent the respective boom sections when not required.

In order to move the crane from one operating position to another and in order to raise and lower the tower with the standard boom folded thereagainst, it is desirable to have the standard boom latched to the tower so that the two will fold as a unit and, of course, to preclude the standard boom from banging against the tower should the carrier be moved to a new site. In order to latch the booms together in the folded position, there is provided the hook 250 shown in FIG. 26. Referring also to FIGS. 27, 28 and 29, it will be seen that the hook is pivoted in sleeve 251 secured to a bracket 252 mounted on the inside of one of the chords 253 of one of the tower boom sections. The outer end of the hook is provided with a relatively large hook opening 255 adapted to engage a transverse tube 256 mounted on brackets or the like 257 secured to the chords of one of the sections of the standard boom. When the hook is thus engaged, the tower and standard boom will then be latched together. The hook also precludes the standard boom from banging against the tower boom and in this manner acts as a spacing brace. Since the hook between the tower and standard boom may be substantially spaced from the operator in the cab of the superstructure 9, it is desirable to have a remote control means for weighing such hook. It may be provided in the form of the cable 259 which extends downwardly to within reach of the operator and is trained about cable sheave 260 mounted on axle 261 (see FIG. 27) extending between brackets 262 and 263 which are welded or otherwise secured to transverse channel member 264 extending between the chord 253 and the opposite front chord of the boom section on which the hook is mounted. From the sheave 260, the cable 259 then passes about the sheave 265 mounted between plates 266 and 267 welded to the top outer edge of the hook 250. From the sheave 265, the cable then passes back about the sheave 268 also journalled on the axle 261 adjacent the sheave 260 and then back about such sheave 268 to link 269 mounted on the axle 270 of the sheave 265. In this manner with the pulley arrangement shown, a mechanical advantage is obtained and the operator may then readily weigh the standard boom from the tower boom simply by exerting a pulling force on the cable 259. When the hook has been pivoted clear of the standard boom transverse tube 256, the operator may then tie the cable 259 to secure the hook in its elevated position. It can then be seen that once the tower is elevated, further assistance is not required to weigh the standard boom and to erect the same from the operator's cab.

It is preferred to employ boom sections composed of high strength, light weight steels preferably using square section tubular chords as seen in FIG. 27 interconnected by continuous round tubular lacing members 270 which are crimped on opposite sides and welded to the flat inner parallel faces of the respective chords. In this manner, each boom section is comprised of a total of eight members, all vertically continuous and each contributing to the compressive loads sustained. The tubular lacing members will normally be welded to adjacent inner faces of each chord so that a developed diamond pattern is provided and in this manner the torsional stresses encountered can readily be absorbed. Reference may be had to FIG. 17 showing in detail the square section chords 272 and 273 with the continuous tubular lacing member 274 extending in zigzag fashion between such chords with the phantom line 275 indicating the continuous lacing member for the opposite pair of chords. Reference may be had to the aforementioned copending application, Serial No. 86,166, entitled "Crane" for a more complete disclosure of such boom sections.

It can now be seen that there is provided certain improvements in conventional cranes permitting employment of a tower boom in effect to elevate the standard operating boom 100 feet or more above its normal foot on the crane superstructure. With the improvements of the present invention, then, it is possible to obtain all of the advantages of a tower crane operation including both the height and reach as well as improved load capacities and especially the mobility of conventional rubber-tired cranes.

Other modes of applying the principle of the invention may be employed, change being made as regards the details described, provided the features stated in any of the following claims or the equivalent of such be employed.

We, therefore, particularly point out and distinctly claim as our invention:

1. In combination, a carrier, a revolving superstructure mounted on said carrier, a vertically extending tower boom, means operative to lock said tower boom in such vertically extending position to said superstructure, an operating boom pivoted to the peak of said tower boom, cable stop means interconnecting said tower and operating booms operative to limit the elevation of said operating boom, cable stop brace means spacing said cable stop means from said operating boom pivot, and spring means urging said cable stop means to an overlapping folded position.

2. The combination set forth in claim 1 wherein said cable stop means comprises two pairs of cables connected respectively to said operating and tower booms and each to said brace means, said spring means comprising a coil spring for each pair of cables extending transversely therebetween adjacent the connection to the respective booms.

3. The combination set forth in claim 2 wherein said operating boom pivot is laterally offset from said tower boom, means operative to fold said operating boom to lie parallel to and adjacent said tower boom, and means to lock said operating and tower booms together.

4. In combination, a carrier, a revolving superstructure mounted on said carrier, a vertically extending tower boom, means operative to lock said tower boom in such vertically extending position to said superstructure, a boom pivot at the top of said tower laterally offset therefrom, an operating boom connected to said tower at said boom pivot, means operative to swing said operating boom about said boom pivot to a position adjacent to and parallel to said tower boom, and pivotally mounted hook means mounted on one of said booms operative to be swung into position to engage the other of said booms to lock said booms together.

5. The combination set forth in claim 4 wherein said hook means is pivoted to said tower boom, and mechanical advantage means connecting said hook means to said tower boom operative to facilitate the pivoting of said hook means to weigh said operating boom.

6. The combination set forth in claim 5 wherein said mechanical advantage means comprises a pull line extending from adjacent the operator's cab in said superstructure about a pulley mounted on said tower boom and about a pulley mounted on the end of said hook means, thence about a further pulley mounted on said tower boom and terminating at the outer end of said hook means.

7. In combination, a carrier, revolving superstructure mounted on said carrier, a vertically extending tower boom, said boom comprising a base section and a peak section providing a pivot for a standard operating boom, a standard operating boom connected to said pivot, a stabilizer mast pivoted to the top of said tower boom base section, strut means pivotally connected to said stabilizer mast and releasably connected to said tower boom base section operative to hold said stabilizer mast at a predetermined angle with respect to said tower boom base section whereby the distal end of said stabilizer mast may be pin-connected to said superstructure as said tower boom is elevated to vertical position, a hoist line, and means operative to connect said hoist line to said strut means whereby said hoist line can be employed to raise and lower said stabilizer mast when said strut means is released from said tower boom base section.

8. The combination set forth in claim 7 including an auxiliary sheave mounted at the outer end of said tower boom base section, a sling adapted to be connected to said strut means whereby said hoist line when trained about said sheave and connected to said sling can be employed to raise and lower said stabilizer mast when said strut means is released from said tower boom base.

9. The combination set forth in claim 7 including a boom derricking reeving system operative to raise and lower said tower boom and said operating boom connected thereto, said strut means including two transverse axles, a pulley mounted on each said axle, one said pulley forming part of said boom derricking reeving system and the other said pulley guiding said hoist line when connected to said operating boom.

10. The combination set forth in claim 9 including pairs of transversely extending brace members on opposite sides of the top of the tower boom base section, said stabilizer mast being pivoted to projecting ends of said brace members, said projecting ends of said brace members facilitating the attachment of said boom derricking reeving system to the end of said tower boom base section whereby said tower boom base section may be operated as a crane boom with the hoist line trained about said auxiliary sheave.

11. In combination, a carrier, a revolving superstructure mounted on said carrier, a vertically extending tower boom, said boom comprising a base section and a peak section providing a pivot for a standard operating boom, a standard operating boom connected to said pivot, a stabilizer mast pivoted to the top of said tower boom base section, strut means pivotally connected to said stabilizer mast and releasably connected to said tower boom base section operative to hold said stabilizer mast at a predetermined angle with respect to said tower boom base section whereby the distal end of said stabilizer mast may be pin-connected to said superstructure as said tower boom is elevated to vertical position, and a tower boom foot adapter mounted on said crane superstructure, said adapter including means to connect said operating boom to said superstructure and alternatively to connect said tower boom to said superstructure.

12. In combination, a carrier, a revolving superstructure mounted on said carrier, a vertically extending tower boom mounted on said superstructure for revolving movement therewith, an operating boom pivoted to the peak of said tower boom laterally offset therefrom and adapted to be folded to lie parallel to said tower boom, boom pendants connected to the peak of said operating boom, a boom derricking reeving system connected to said boom pendants operative to raise and lower said tower boom and to swing said operating boom about said operating boom pivot, said boom derricking reeving system comprising an upper floating harness connected to said boom pendants, a floating link, a cable entrained about said upper harness and said floating link and wound upon a lifting drum, a second lifting drum, a cable wound on said second lifting drum and about said floating link, said second drum being adapted to move said floating link with respect to said floating harness thereby to unwind said first mentioned cable from said first mentioned drum, said pendants being pivotally connected to an upper and lower mast pivotally mounted at the peak of said tower boom, said upper and lower mast providing moment arms for said pendants with respect to said tower and operating booms respectively.

13. In combination, a carrier, a revolving superstructure mounted on said carrier, a vertically extending tower boom mounted on said superstructure for revolving movement therewith, an operating boom pivoted to the peak of said tower boom laterally offset therefrom and adapted to be folded to lie parallel to said tower boom, boom pendants connected to the peak of said operating boom, a boom derricking reeving system connected to said boom pendants operative to raise and lower said tower boom and to swing said operating boom about said operating boom pivot, said boom derricking reeving system comprising an upper floating harness connected to said boom pendants, a floating link, a cable entrained about said upper harness and said floating link and wound upon a lifting drum, a second lifting drum, a cable wound on said second lifting drum and about said floating link, said second drum being adapted to move said floating link with respect to said floating harness thereby to unwind said first mentioned cable from said first mentioned drum, said floating harness including a transverse support member having vertically extending side guide bars mounted thereon adapted to support and guide said floating harness on said tower boom when in horizontal position.

14. In combination, a carrier, a revolving superstructure mounted on said carrier, a vertically extending tower boom mounted on said superstructure for revolving movement therewith, an operating boom pivoted to the peak of said tower boom laterally offset therefrom and adapted to be folded to lie parallel to said tower boom, boom pendants connected to the peak of said operating boom, a boom derricking reeving system connected to said boom pendants operative to raise and lower said tower boom and to swing said operating boom about said operating boom pivot, said boom derricking reeving system comprising an upper floating harness connected to said boom pendants, a floating link, a cable entrained about said upper harness and said floating link and wound upon a lifting drum, a second lifting drum, a cable wound on said second lifting drum and about said floating link, said second drum being adapted to move said floating link with respect to said floating harness thereby to unwind said first mentioned cable from said first mentioned drum, said floating links comprising two pairs of sheaves linked together, said first derricking cable being trained about two axially aligned sheaves at the upper end of said link and said second derricking cable being trained about the two axially aligned sheaves at the bottom of said link.

15. In combination, a carrier, a revolving superstructure mounted on said carrier, a vertically extending tower boom mounted on said superstructure for revolving movement therewith, an operating boom pivoted to the peak of said tower boom laterally offset therefrom and adapted to be folded to lie parallel to said tower boom, boom pendants connected to the peak of said operating boom, a boom derricking reeving system connected to said boom pendants operative to raise and lower said tower boom and to swing said operating boom about said operating boom pivot, said boom derricking reeving system comprising an upper floating harness connected to said boom pendants, a floating link, a cable entrained about said upper harness and said floating link and wound upon a lifting drum, a second lifting drum, a cable wound on said second lifting drum and about said floating link, said second drum being adapted to move said floating link with respect to said floating harness thereby to unwind said first mentioned cable from said first mentioned drum, a safety pawl operative to engage said second drum to preclude movement of said floating link when said tower has thus been elevated, and means operative to lock said pawl into or out of engagement with said second drum.

16. In combination, a carrier, a revolving superstructure mounted on said carrier, a vertically extending tower boom mounted on said superstructure for revolving movement therewith, an operating boom pivoted to the peak of said tower boom laterally offset therefrom and adapted to be folded to lie parallel to said tower boom, boom pendants connected to the peak of said operating boom, a boom derricking reeving system connected to said boom pendants operative to raise and lower said tower boom and to swing said operating boom about said operating boom pivot, said boom derricking reeving system comprising an upper floating harness connected to said boom pendants, a floating link, a cable entrained about said upper harness and said floating link and wound upon a lifting drum, a second lifting drum, a cable wound on said second lifting drum and about said floating link, said second drum being adapted to move said floating link with respect to said floating harness thereby to unwind said first mentioned cable from said first mentioned drum, a stabilizer mast assembly pivoted to said tower boom and pin-connected to said superstructure when said tower boom is vertically positioned, a strut frame interconnecting said stabilizer mast and said tower boom, a transverse axle interconnecting said stabilizer mast and said strut frame, and cable rollers mounted on said transverse axle, said first and second boom derricking cables being trained over said cable rollers.

17. In combination, a carrier, a revolving superstructure mounted on said carrier, a vertically extending tower boom, said boom comprising a base section and a peak section providing a pivot for a standard operating boom, a standard operating boom connected to said pivot, and a tower boom foot adapter mounted on said revolving superstructure to which said tower boom base section is pivoted, said adapter including means to connect said tower boom to said superstructure and alternatively to connect said standard operating boom to said superstructure.

References Cited in the file of this patent
UNITED STATES PATENTS

| | | |
|---|---|---|
| 2,787,344 | Woolslayer | Apr. 2, 1957 |
| 2,924,341 | Bahr et al. | Feb. 9, 1960 |
| 2,937,726 | Walther | May 24, 1960 |
| 3,037,641 | Potter et al. | June 5, 1962 |